United States Patent [19]

Miroshnichenko et al.

[11] 4,254,350
[45] Mar. 3, 1981

[54] ASYNCHRONOUS LINE-FED MOTOR

[76] Inventors: Vitaly T. Miroshnichenko, ulitsa Oktyabrskaya, 29, kv. 10, Smela Cherkasskoi oblasti; Alexandr D. Popov, prospekt Koroleva, 12, kv. 154; Vladimir A. Solomin, ulitsa Dachnaya, 14, kv. 31, both of Rostov-na-Donu; Vladimir A. Trofimov, ulitsa Bogdana Khmelnitskogo, 22, kv. 11, Smela Cherkasskoi oblasti, all of U.S.S.R.

[21] Appl. No.: 57,022

[22] Filed: Jul. 12, 1979

[51] Int. Cl.$^3$ ............................................. H02K 41/00
[52] U.S. Cl. ..................................................... 310/13
[58] Field of Search ..................................... 310/12–19

[56] References Cited

U.S. PATENT DOCUMENTS

| | | | |
|---|---|---|---|
| 3,644,762 | 2/1972 | Eastham | 310/15 |
| 3,770,995 | 11/1973 | Eastham et al. | 310/13 |
| 3,836,799 | 9/1974 | Eastham et al. | 310/13 |

*Primary Examiner*—Donovan F. Duggan
*Attorney, Agent, or Firm*—Burgess, Ryan and Wayne

[57] ABSTRACT

An asynchronous line-fed motor comprising an inductor composed of individual laminated cores which form two rows extending in the direction of travel of the magnetic field. Each laminated core is formed by rods having pole shoes at one end and enveloped by yokes at the opposite end. The pole shoes of the laminated cores of the second row link the laminated cores of the first row to one another and are interposed between the pole shoes of the laminated cores of the first row. The yokes of the laminated cores of the first and second rows face in opposite directions. Coils of a concentrated multiphase winding are wound around the yokes of the laminated cores. The motor also includes a secondary current-carrying element disposed in the air gap between the pole shoes of the laminated cores.

1 Claim, 1 Drawing Figure

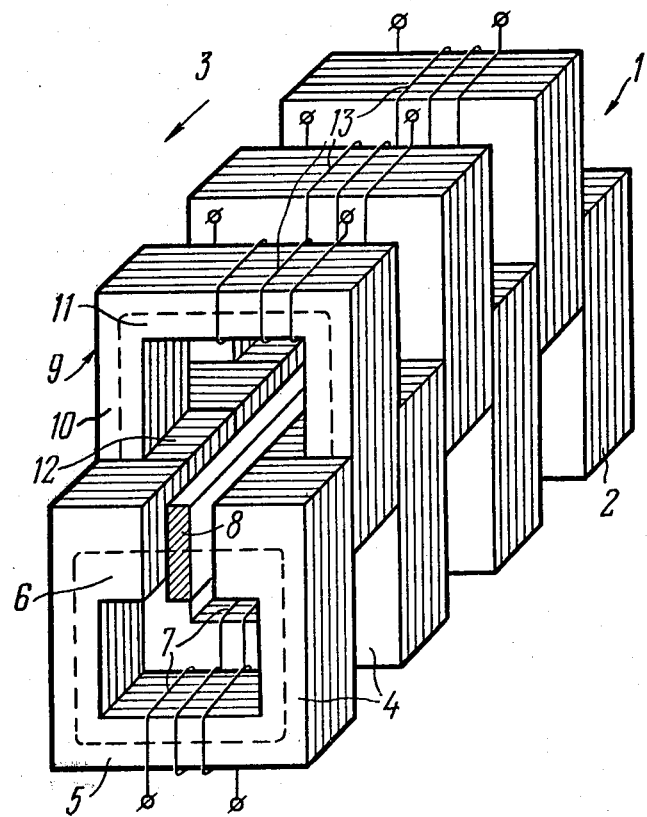

ASYNCHRONOUS LINE-FED MOTOR

FIELD OF THE INVENTION

The present invention relates to electrical machines and, more particularly, to asynchronous line-fed motors.

The invention is applicable to electric drives whereof the working members are set in straight-line or reciprocating motion; the motor of this invention can also be used in conveyers and means for pumping molten metals and current-carrying fluids.

BACKGROUND OF THE INVENTION

There is known an asynchronous line-fed motor wherein the inductor is composed of individual laminated cores around which there is wound a concentrated multiphase winding. The cores form a row extending in the direction of travel of the magnetic field. The inductor is movable in relation to a secondary element having a current-carrying portion mounted on a magnetically conducting base (cf. U.K. Pat. No. 1,373,054, Cl. H2A).

The asynchronous line-fed motor under review has a low efficiency and develops a limited tractive effort.

There is also known an asynchronous line-fed motor (cf. French Pat. No. 1,592,065, Cl. H 02 K 41/04) comprising an inductor composed of individual laminated cores forming a row which extends in the direction of travel of the magnetic field. The cores have rods linked by a yoke. The rods have pole shoes at one of their ends. Coils of a concentrated multiphase winding are wound around the yokes which link the opposite ends of the rods. The inductor is movable in relation to a secondary current-carrying element of a current-carrying material which is shaped as a parallelepiped wherein the greater faces are symmetrically arranged between the pole shoes of the laminated cores.

The foregoing motor is objectionable because of a non-uniform distribution of the magnetizing force in the gaps between the pole shoes of the laminated cores of the inductor and the secondary element which is due to the serrated shape of the active zone of the inductor, i.e., of the inductor surface facing the secondary current-carrying element. The non-uniform distribution of the magnetizing force in this gap accounts for a low efficiency and limited tractive effort of the motor.

SUMMARY OF THE INVENTION

It is an object of the present invention to increase the tractive force of asynchronous line-fed motors.

It is another object of the invention to increase the efficiency of asynchronous line-fed motors.

The foregoing objects are attained by providing an asynchronous line-fed motor comprising an inductor composed of individual laminated cores having rods which carry pole shoes at one end and are linked at their opposite ends by yokes with coils of a concentrated multiphase winding and a secondary current-carrying element disposed in the air gap between the pole shoes of the laminated cores which form a row extending in the direction of travel of the magnetic field, the motor being characterized, in accordance with the invention, in that it includes a second row of identical laminated cores which link together the laminated cores of the first row, the pole shoes of the laminated cores of the second row being interposed between the pole shoes of adjacent laminated cores of the first row, immediately adjacent thereto, the yokes of the laminated cores of the second row being enveloped by other coils of the concentrated multiphase winding and facing opposite to the yokes of the laminated cores of the first row.

The asynchronous line-fed motor according to the invention, features a sinusoidal distribution of the magnetizing force in the gaps between the secondary current-carrying element and the poles of the inductor which accounts for an increased tractive force and efficiency of the motor. Thus, the motor of this invention makes it possible to improve the efficiency of mechanisms in which it is incorporated. Improved efficiency means lower operational costs.

BRIEF DESCRIPTION OF THE ACCOMPANYING DRAWING

Other objects and advantages of the present invention will become more apparent from a consideration of the following detailed description of a preferred embodiment thereof to be read in conjunction with the accompanying drawing which is a general axonometric view of an asynchronous line-fed motor in accordance with the invention.

DETAILED DESCRIPTION OF THE INVENTION

Referring to the attached drawing, the asynchronous line-fed motor according to the invention comprises an inductor 1 composed of individual laminated cores 2 which form a row extending in the direction of travel of the magnetic field, indicated by an arrow 3. The laminated cores 2 are composed of rods 4 linked at one end by a yoke 5. At their opposite ends, the rods 4 carry pole shoes 6. Coils 7 of a concentrated multiphase winding are wound around the yoke 5 of each laminated core 2.

The motor further includes a secondary current-carrying element 8 disposed between the pole shoes 6 of the laminated cores 2. The element 8 is of a current-carrying material and is shaped as a parallelepiped. The inductor 1 and the secondary current-carrying element 8 are movable relative to each other.

The laminated cores 2, which form the first row extending in the direction of travel of the magnetic field, are interconnected by identical laminated cores 9 which form a second row. The cores 9 have rods 10 linked by yokes 11. The rods 10 carry pole shoes 12. The yokes 11 of the laminated cores 9 face opposite to the yokes 5 of the laminated cores 2. As seen from the attached drawing, the pole shoes 12 and 6 of the laminated cores 9 and 2, respectively, are immediately next to each other, so that the active zone of the inductor 1, i.e., the surfaces of the pole shoes 12 and 6 facing the secondary current-carrying element 8, is continuous and without gaps.

Wound around the yokes 11 of the laminated cores 9 of the second row are other coils 13 of the concentrated multiphase winding. The lamination of the cores 2 and 9 is perpendicular to the direction 3 of travel of the magnetic field, so that the magnetic flux is closed in planes extending at a perpendicular to the direction 3 of travel of the magnetic field. The direction of closure of the magnetic flux is indicated by dash lines.

The asynchronous line-fed motor according to the invention operates as follows.

As the coils 7 and 13 of the multiphase winding of the inductor 1 are connected to a multiphase current source (not shown), a magnetic field is produced, which travels in the direction indicated by the arrow 3. The components of this field are closed in the transverse direction, i.e., in the direction of lamination of the cores 2 and 9. The traveling magnetic field traverses the secondary current-carrying element 8 and produces electromotive forces which, in turn, induce eddy currents in the element 8. The eddy currents interact with the traveling magnetic field of the inductor 1. The resultant tractive force drives the inductor 1 in the direction opposite to the arrow 3. The magnetizing force is uniformly distributed between the pole shoes 6 and 12 of the laminated cores 2 and 9, respectively, and the faces of the secondary current-carrying element 8, because the active zone of the inductor 1 has no gaps. The overall result is an increased tractive effort and efficiency of the motor.

To summarize, the invention makes it possible to increase the tractive force and efficiency of asynchronized line-fed motors.

What is claimed is:

1. An asynchronous line-fed motor comprising:
    an inductor composed of individual laminated cores which form two rows extending in the direction of travel of the magnetic field;
    said laminated cores being formed by rods which are linked by yokes at one end;
    said rods of said laminated cores carrying pole shoes at their opposite ends;
    a concentrated multiphase winding comprising coils which are wound around said yokes of said laminated cores;
    said pole shoes of said laminated cores of the second row interconnecting said laminated cores of the first row, being disposed between said pole shoes of said laminated cores of the first row, immediately next thereto;
    said yokes of said laminated cores of the first row facing in one direction;
    said yokes of said laminated cores of the second row facing opposite to said yokes of said laminated cores of the first row;
    a secondary current-carrying element interposed between said pole shoes of said laminated cores and
    said inductor and said secondary current-carrying element being movable relative to each other.

* * * * *